US006563599B1

(12) United States Patent
Whitfield

(10) Patent No.: US 6,563,599 B1
(45) Date of Patent: May 13, 2003

(54) METHOD AND APPARATUS FOR IMPROVING PERFORMANCE OF FACSIMILE TRANSMISSIONS OVER IP NETWORKS

(75) Inventor: Michael Whitfield, Valbonne (FR)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/411,508

(22) Filed: Oct. 4, 1999

(51) Int. Cl.[7] .......................... G06F 15/00; G06K 1/00; H04N 1/32
(52) U.S. Cl. ...................................... 358/1.15; 358/442
(58) Field of Search ................................ 358/1.15, 442, 358/434, 440, 400, 402, 426.01, 426.02; 379/100.01; 714/39, 41, 47, 748, 736, 749, 822; 709/311, 310; 713/153

(56) References Cited

U.S. PATENT DOCUMENTS

| | | | | | |
|---|---|---|---|---|---|
| 5,416,607 A | * | 5/1995 | Tezuka et al. | ............... | 358/468 |
| 5,729,356 A | * | 3/1998 | Nonomura | ................... | 358/434 |
| 5,790,266 A | * | 8/1998 | Nakamura et al. | .......... | 358/434 |
| 5,790,641 A | * | 8/1998 | Chan et al. | ............ | 379/100.17 |
| 5,838,683 A | * | 11/1998 | Corley et al. | ............... | 370/408 |
| 6,023,470 A | * | 2/2000 | Lee et al. | .................... | 370/401 |
| 6,064,653 A | * | 5/2000 | Farris | .......................... | 370/237 |
| 6,185,204 B1 | * | 2/2001 | Voit | ............................ | 370/352 |
| 6,259,538 B1 | * | 7/2001 | Amit et al. | ................. | 358/442 |
| 6,438,105 B1 | * | 8/2002 | Qarni et al. | ................. | 370/231 |
| 2002/0118671 A1 | * | 8/2002 | Staples | ........................ | 370/352 |

* cited by examiner

Primary Examiner—Madeleine Nguyen
(74) Attorney, Agent, or Firm—Farjami & Farjami LLP

(57) ABSTRACT

A method for avoiding time-outs during facsimile transmissions over IP networks is disclosed. In the disclosed method, T.30 commands and responses are passed in V.21 channel 2 ("ch2") modulation with HDLC framing. Normally, when a T.30 message is sent, the V.21 ch2 carrier starts, then there is one second of HDLC flags, followed by the contents of the message. In a method according to the present invention, the V.21 ch2 carrier and HDLC flags are started when a response is late from the remote facsimile machine. This step is preferably initiated on occasions when a time-out would otherwise be likely in view of the late response. If the response from the remote facsimile machine arrives during the one second HDLC flags, the message is sent to the remote facsimile normally. If the message has not been received by the end of the one second HDLC flags, this period is extended for an additional two seconds. If the response arrives during this extended period of HDLC flags, the message is sent immediately. This HDLC flags preamble extension method avoids time-outs by making the facsimile machine think the message is being received, rather than doing a time consuming restart.

If the message has not been received by the end of the extended three second period of HDLC flags, then the preferred method may fall back on an alternative spoofing scheme.

12 Claims, 5 Drawing Sheets

METHOD AND APPARATUS FOR IMPROVING PERFORMANCE OF FACSIMILE TRANSMISSIONS OVER IP NETWORKS

BACKGROUND OF THE INVENTION

1. Technical Field

The present invention relates, generally, to implementing facsimile transmissions over an IP network.

2. Background Art and Technical Problems

The transfer of facsimile documents in real-time between standard facsimile terminals over telephone lines typically conforms to the procedures and specifications in the ITU telecommunications standard generally known as T.30. These procedures and specifications were developed for the public switched telephone network, or PSTN. In that environment, if no activity occurs on the line for a certain period of time, the protocol provides that the facsimile equipment will time out. The facsimile machine will assume that the connection has been lost, and will disconnect (or hang up) when such a time out occurs. This protocol has also been used in ISDN. The T.30 protocol has very strict timing requirements.

The availability of IP networks such as the Internet providing international communications among users offers the potential of using such networks to send and receive facsimile documents. However, delays inherent in such Internet Protocol or IP networks create problems. When there is no activity on the line, the protocol will often time out. Time outs can occur over an IP network when a frame is late due to IP network delay. The facsimile machines following the T.30 protocol will time out and hang up, and consequently, the attempted facsimile transmission will fail.

Efforts to develop procedures for real-time facsimile transmission over IP networks include a draft ITU-T recommendation T.38 (06/98), the disclosure of which is incorporated herein by reference. The current draft of ITU-T recommendation T.38 (06/98) does not directly address the issue of protocol timeouts.

Attempts to deal with the problem of time outs in facsimile transmissions over IP networks have included a technique sometimes called T.30 spoofing. In this scheme, a fax over IP gateway tries to guess what T.30 frames will be sent and sends the best guesses at the right time to avoid time outs. But if the guess is wrong, the T.30 spoofing technique has to invoke a recovery scheme. The T.30 spoofing technique must follow the T.30 protocol very closely, and must take guesses at what frames to send. The T.30 spoofing technique must know how to generate frames to cancel and then re-start the T.30 negotiation, while making sure that the two facsimile machines at each end have their timing satisfied and do not hang up. The spoofing technique requires intelligence to be introduced into the gateways so that the gateways decode fax negotiation messages. Using such decoded information, the gateways must use complicated, and sometimes time consuming, schemes to try to prevent time-outs and to overcome delays in an IP network. Improved techniques are needed for preventing time-outs during fax over IP transmissions.

Thus, efforts to develop schemes to allow transmission of facsimile documents over Internet Protocol networks have not been altogether satisfactory, and significant room for improvement still exists.

SUMMARY OF THE INVENTION

In accordance with an exemplary embodiment of the present invention, a method for transmission of facsimile documents over IP networks avoids T.30 protocol time outs by sending the start of a frame preamble if a response from the remote facsimile machine has not been received in time, and by extending the preamble until the response from the remote facsimile arrives.

A method for transmission of facsimile documents over IP networks in accordance with the present invention is simpler than a T.30 spoofing scheme. All the method of the present invention needs to know is when to expect a T.30 frame so that the preamble generation can be preemptively started to avoid a time out.

BRIEF DESCRIPTION OF THE DRAWINGS

The present invention will hereinafter be described in conjunction with the appended drawing figures, wherein like numerals denote like elements, and.

DETAILED DESCRIPTION OF A PREFERRED EXEMPLARY EMBODIMENT

Figure 1:
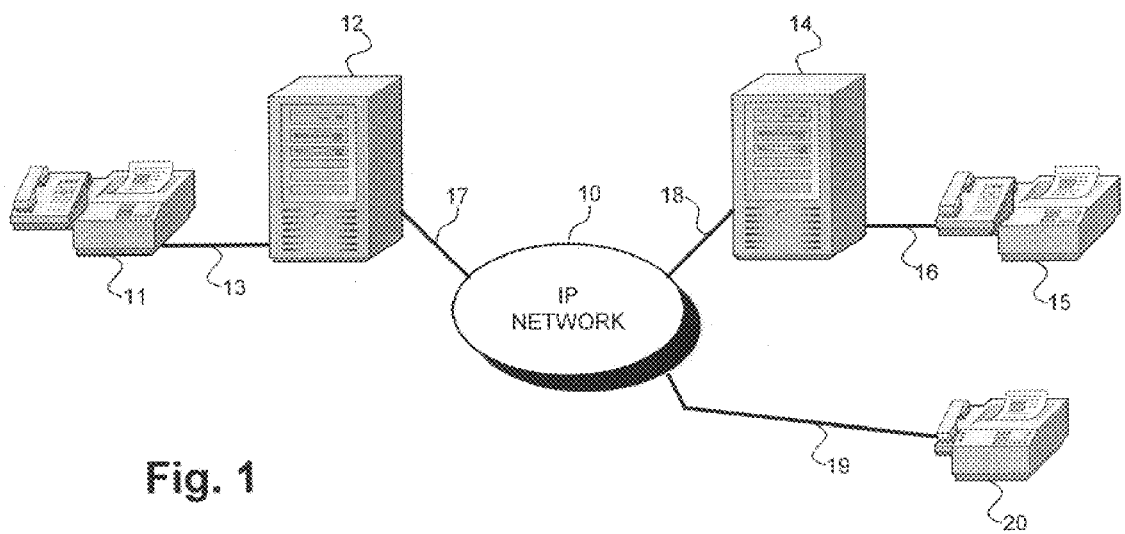
FIG. 1 is a schematic representation of two facsimile machines each connected to gateways, which are in turn connected to an IP network, as well as an internet aware facsimile device connected to the IP network.

FIG. 1 is a modified version of a figure appearing in the draft ITU-T recommendation T.38 (06/98), the entire disclosure of which is incorporated herein by reference. FIG. 1 may be used to explain an example of an environment in which the present invention may be advantageously applied.

FIG. 1 illustrates a schematic representation of a first local facsimile machine 11 connected to a local gateway 12 via a telephone line 13. The local facsimile machine 11 may be a G3 facsimile terminal, but is not necessarily limited to any particular type of facsimile machine. The local gateway 12 is connected via a datalink or digital link 17 to a network 10 employing the Internet Protocol, referred to as an IP network 10. Of course, the IP network 10 is preferably the Internet, but the present invention may be advantageously applied to any IP network. The illustrated telephone line 13 is part of the public switched telephone network, or PSTN 13. However, the present invention is not necessarily limited to such an arrangement. Alternatively, the telephone line 13 may be a local phone line connected to the gateway 12 through a private branch exchange, or PBX. The telephone line 13 could be directly wired to the gateway 12. The telephone line 13 may also be an ISDN line, a T1 line, or any suitable type of telephone line or communication path capable of transmitting audio or facsimile signals, either analog or digital.

The local gateway 12 may establish a connection to a remote gateway 14 over the IP network 10. The remote gateway 14 can call a second remote facsimile machine 15 over a telephone line 16 and establish a virtual connection between the first facsimile machine 11 and the second facsimile machine 15. In accordance with the present invention, a facsimile transmission may be accomplished from the local facsimile machine 11 to the remote facsimile machine 15 over the IP network 10.

The remote gateway 14 is shown connected to the IP network 10 via a datalink or digital link 16. The illustrated telephone line 16 is part of the public switched telephone network, or PSTN 16. However, the present invention is not necessarily limited to such an arrangement. Alternatively, the telephone line 16 may be a local phone line connected to the gateway 14 through a private branch exchange, or PBX. The telephone line 16 could be directly wired to the gateway 14. The telephone line 16 may also be an ISDN line, a T1 line, or any suitable type of telephone line or communication path capable of transmitting audio or facsimile signals, either analog or digital.

When sending a facsimile transmission over the IP network 10, data transport may be provided by using Transmission Control Protocol ("TCP") over the IP network 10, sometimes referred to as TCP/IP. Alternatively, data transport may be provided using User Datagram Protocol ("UDP") over the IP network 10. Optional means for error control known to those skilled in the art may be employed.

The present invention is not necessarily limited to the particular arrangement described above. For example, the local facsimile machine 11 may connect over the IP network 10 with an internet aware facsimile device 20 over a network or dial-up connection 19, or vice-versa. The internet aware facsimile device 20 may be a facsimile-enabled device such as a PC computer directly connected to the IP network 10. The device 20 may include a virtual receiving gateway as part of the device's facsimile enabling software and/or hardware. In addition, the present invention may be applied in an environment consisting of two such internet aware facsimile devices 20 connected to each other over an IP network 10.

Figure 2:
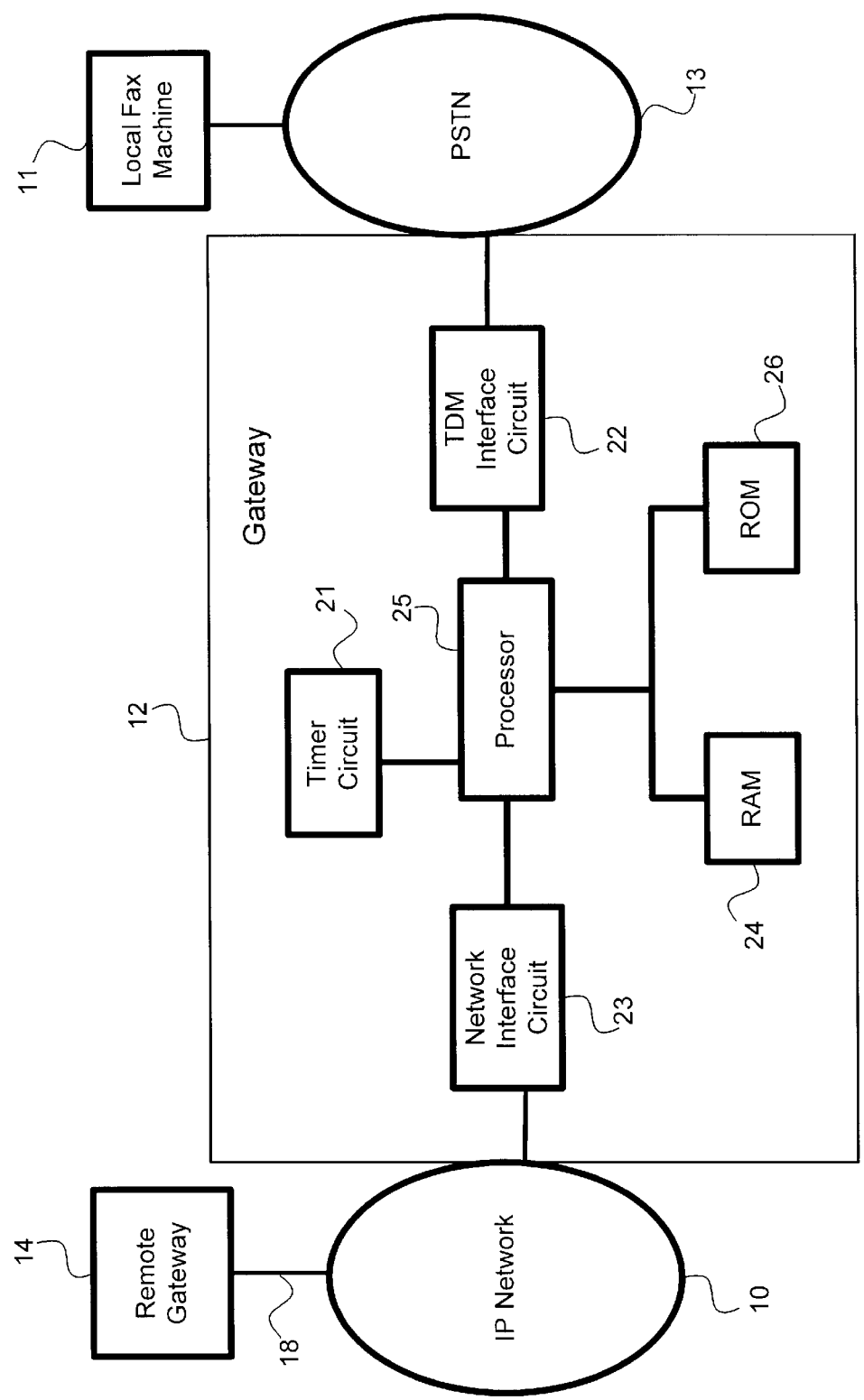
FIG. 2 is a schematic representation showing more details of a local gateway connected to an IP network, and having a local facsimile machine connected to the local gateway via the PSTN.

FIG. 2 is a block diagram of components of a gateway 12 illustrating details of the gateway 12 shown in FIG. 1. The illustration is equally applicable to the gateway 14 shown in FIG. 1 as well.

As shown in FIG. 2, the gateway 12 is coupled to the PSTN 13 through an interface circuit 22. The interface circuit 22 is preferably a time division multiplexer or TDM interface 22. The interface circuit 22 includes analog-to-digital and digital-to-analog converters to convert the analog signal over the telephone line 13 to a digital signal, and vice-versa. A DTMF detector circuit, and a DTMF generator may also be included, or alternatively, concadence techniques may be employed for DTMF detection and DTMF tones generated directly by digital-to-analog conversion.

The TDM interface circuit 22 couples digital signals to a processor 25. The processor 25 is also coupled to a network interface circuit 23. The network interface circuit 23 is coupled to the IP network 10. Digital packets representing facsimile data may be received from the IP network 10 via the network interface circuit 23, and gated or passed to the processor 25 for processing. The processor 25 processes the data in accordance with the present invention, and passes the data to the interface circuit 22 to be translated into analog signals to be sent over the telephone line 13 to the facsimile machine 11. Alternatively, the transmission may occur in the other direction, i.e., analog signals are received over the telephone line 13 via the interface circuit 22 and converted to digital signals which are coupled to the processor 25. The processor 25 processes the signals, and passes them to the network interface circuit 23 from which the signals are coupled to the IP network 10 in an appropriate packet format. The processor 25 advantageously employs a method in accordance with the present invention described in more detail below to avoid time-outs during facsimile transmissions over the IP network 10.

The gateway 12 also includes a timer circuit 21 coupled to the processor 25. A random access memory or RAM 24 is coupled to the processor 25. The RAM 24 may be used by the processor 25 to store data and intermediate results. A read only memory or ROM 26 is also coupled to the processor 25. The ROM 26 may be used to store instructions and tables for the processor 25.

Figure 3:
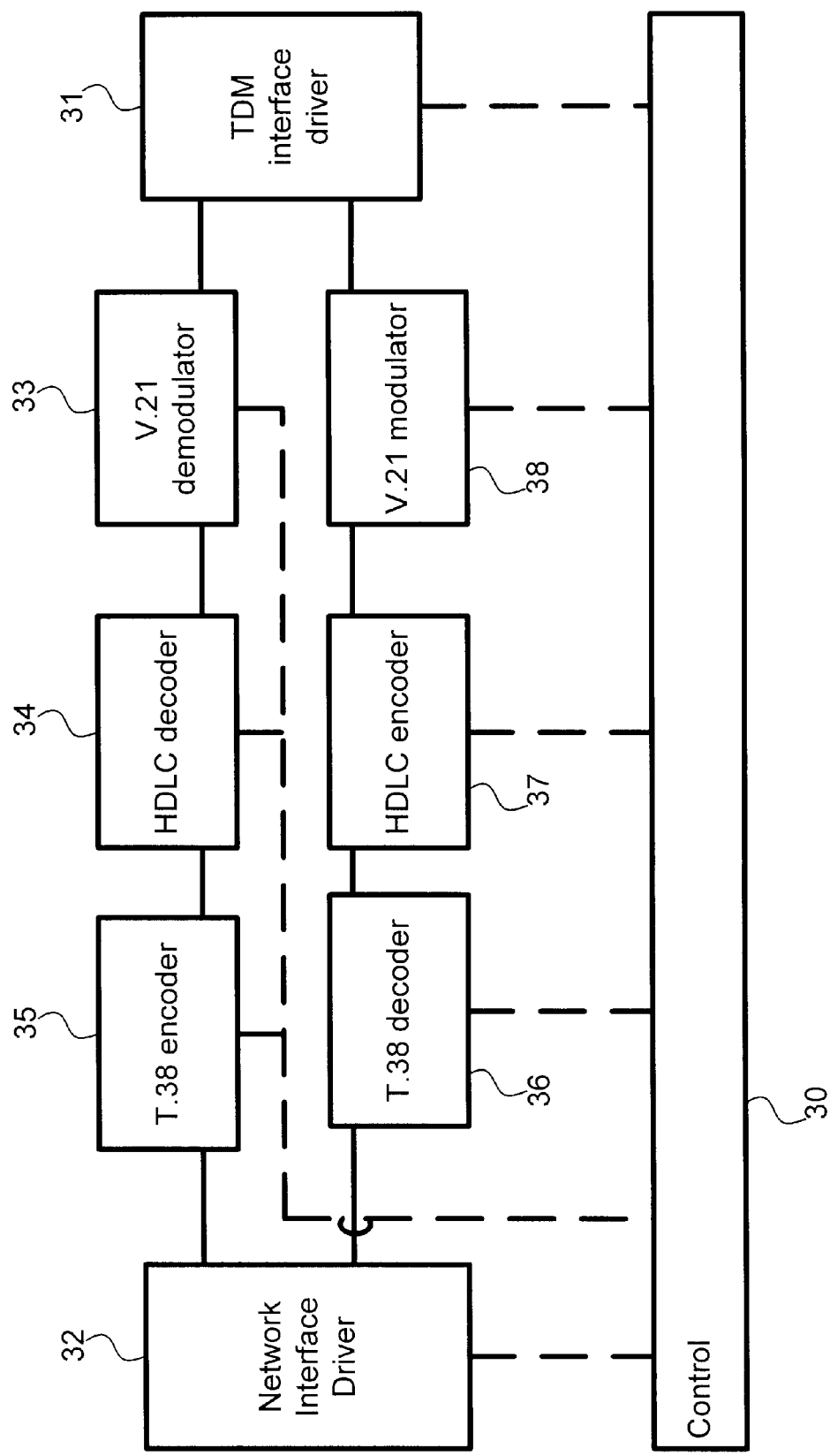
FIG. 3 is a block diagram of software executed by the processor illustrated in FIG. 2.

FIG. 3 shows a block diagram of software executed by the processor 25. Control software 30 controls the overall operation of the processor 25 and links to all of the software modules shown in FIG. 3 (shown as dashed lines). The TDM interface circuit 31 is controlled by a TDM interface driver 31. The network interface circuit is controlled by a network interface driver 32.

Data that is received from the TDM interface circuit 22 via the TDM interface driver 31 is processed by a V.21 demodulator 33. This processed information is then processed by a HDLC decoder 34. The data is than passed to a T.38 encoder 35. The encoded information is coupled to the network interface driver 32 for transmission over the IP network 10 via the network interface circuit 23.

Data that is received from the network interface circuit 23 via the network interface driver 32 is processed by a T.38 decoder 36. This decoded information is then processed by a HDLC encoder 37. The data is then passed to a V.21 modulator 38. The modulated information is coupled to the TDM interface driver 31 for transmission over the telephone line 13 via the TDM interface circuit 22.

A method in accordance with the present invention avoids time-outs during facsimile transmissions over an IP network 10 more efficiently than prior spoofing schemes. In the present invention, T.30 commands and responses are passed in V.21 channel 2 ("ch2") modulation with HDLC framing. Normally, when a T.30 message is sent, the V.21 ch2 carrier starts, then there is one second of HDLC flags, followed by the contents of the message. In a method according to the present invention, the V.21 ch2 carrier and HDLC flags are started when a response is late from the remote facsimile machine 15. This step is preferably initiated on occasions when a time-out would otherwise be likely in view of the late response. If the response from the remote facsimile machine 15 arrives during the one second HDLC flags, the message is sent to the remote facsimile 15 normally. The remote facsimile machine 15 would not be aware that the real message had not arrived when the carrier was started.

If the message has not been received by the end of the one second HDLC flags, this period is extended. In a preferred embodiment, the HDLC flags are extended for an additional two seconds. If the response arrives during this extended period of HDLC flags, the message is sent promptly, or preferably substantially immediately. This HDLC flags preamble extension method avoids time-outs by making the facsimile machine 11 think the message is being received, rather than doing a time consuming restart.

If the message has not been received by the end of the extended period of HDLC flags, which comprises a total period of three seconds of HDLC flags, then the preferred method may fall back on an alternative spoofing scheme. For example, the T.30 command repeat message would be sent. The command would not necessarily be passed to the remote facsimile machine 15 by the gateway 12, but the local facsimile machine 11 would restart thinking it had sent a second command in response to the command repeat message. When the response eventually did come in from the remote facsimile machine 15, the local facsimile machine 11 would be tricked into thinking it was an on-time response to the second command (i.e., response to the "command repeat" message), and not a late response to the first command.

Figure 4A:
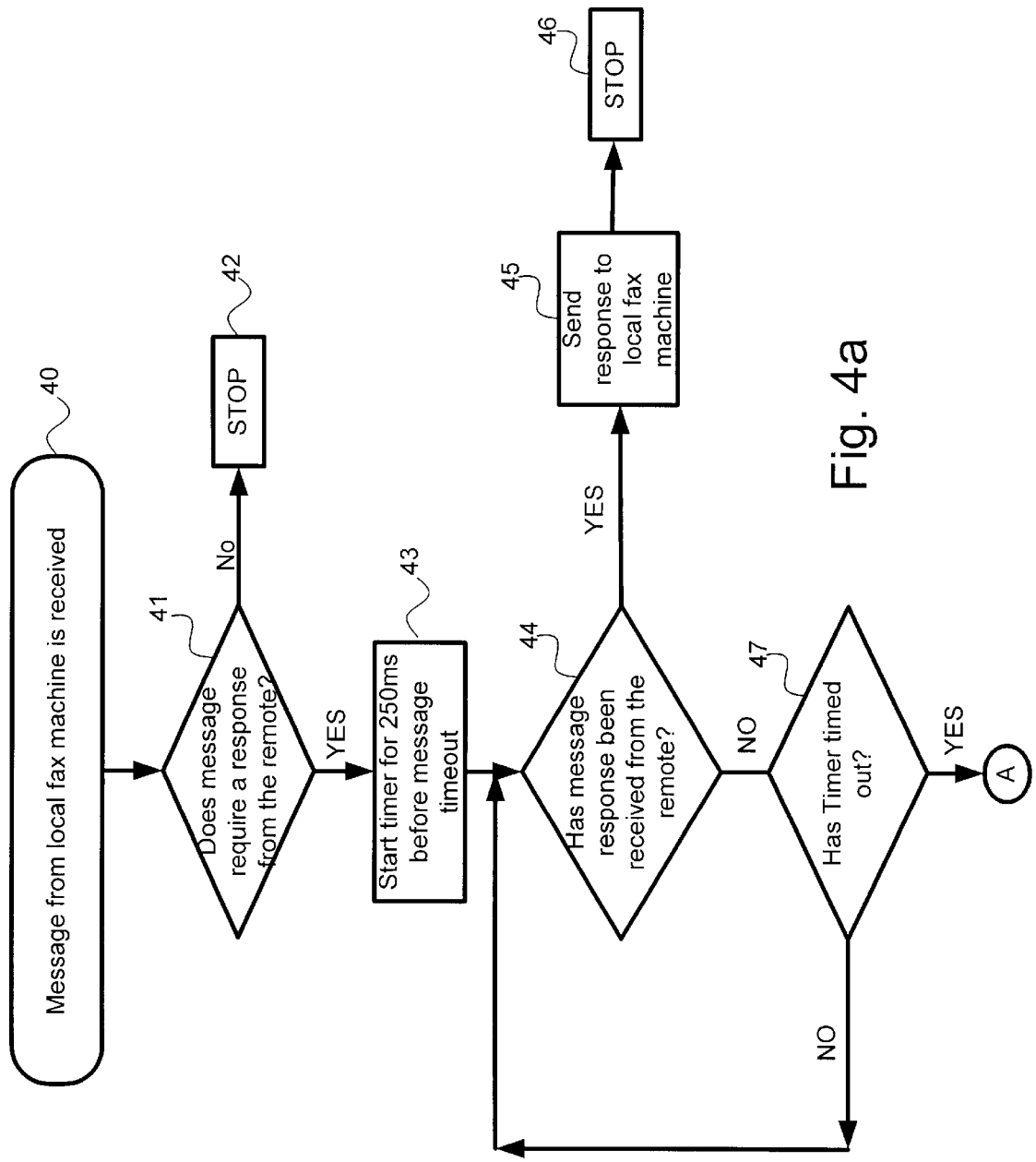
FIG. 4A is a flow chart illustrating steps in a method according to the present invention; and, FIG. 4B is a continuation of the flow chart shown in FIG. 4A.
Figure 4B:
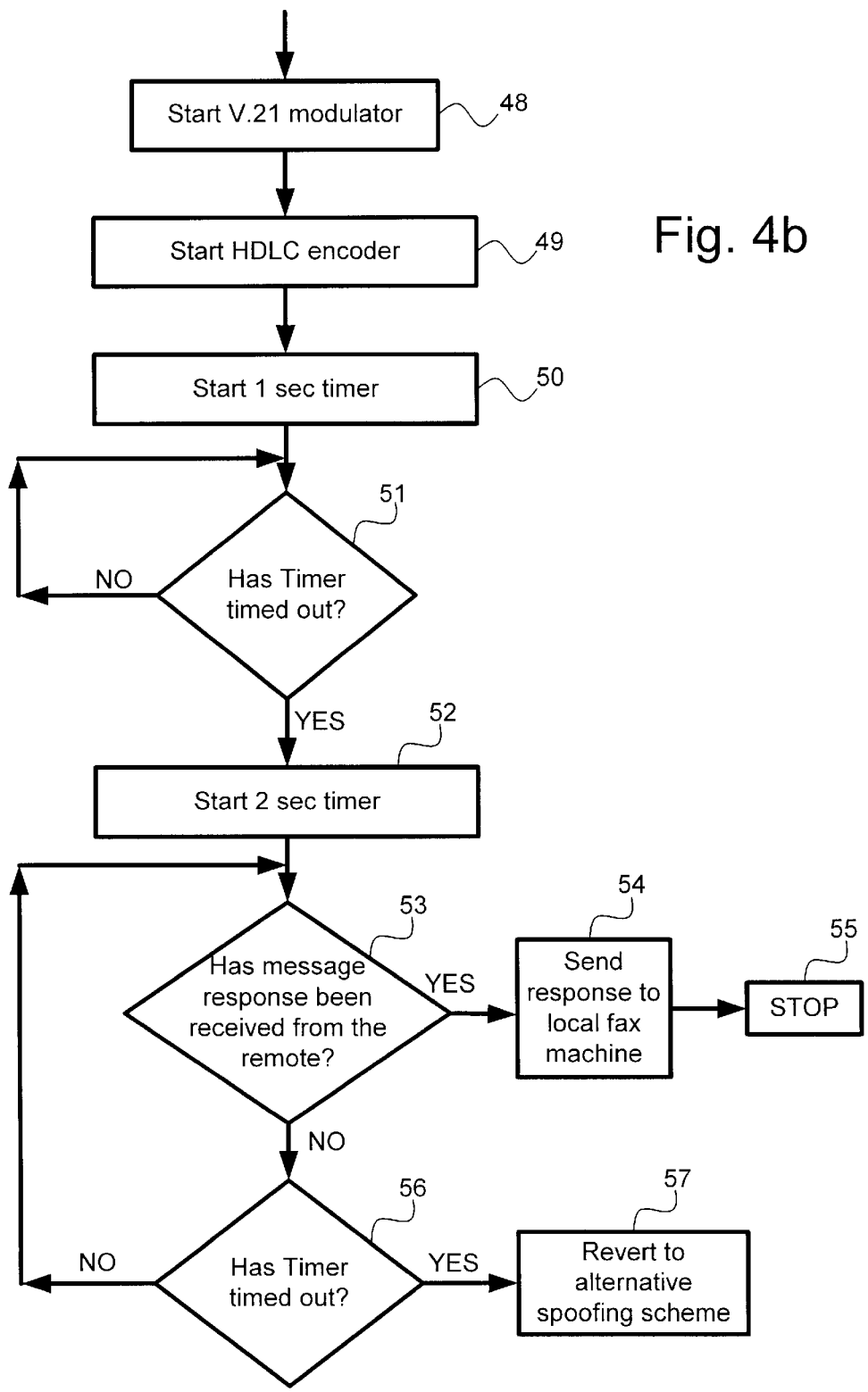

The steps of a method in accordance with the present invention is illustrated in the flow chart of FIG. 4A and FIG. 4B. The method begins with step 40 shown in FIG. 4A, where a message from the local facsimile 11 is received by the gateway 12. Of course, the message is coupled to the processor 25 by the TDM interface circuit 22 coupled to the local facsimile machine 11 via the telephone line 13, and the processor 25 preferably performs the steps of the method. In step 41, a determination is made whether the message requires a response from the remote facsimile machine 15. If no response is required, the method proceeds to step 42, that is, a time-out is not a risk in this instance and further steps are not required.

If a response is required, the method proceeds to step 43. The timer circuit 21 is started for a first predetermined period of time that will expire before a message time-out would otherwise occur. Step 43 is a step of delaying for a first predetermined period of time short of the length of time that will cause a message time-out. In a preferred embodiment, the delay is until 250 milliseconds short of a message time-out. In this example, 250 milliseconds is selected as a preferred safety margin to allow sufficient time to execute succeeding steps in the method to prevent a message time-out. Shorter time margins may be selected, if desired, and may be particularly desirable with fast hardware or software capable of executing the following method steps before a message time-out can occur. A determination is made in step 44 whether a response has been received from the remote facsimile machine 15. If a response has been received, the method proceeds to step 45 and a response is sent to the local facsimile machine 11. The next step 46 is to stop, because in this example the cycle would have been completed and the response received before a time-out would have occurred.

If no response has been received in step 44, a determination is made in step 47 whether the timer 21 has timed out. If the timer has not yet timed out, the method loops back to step 44. However, in step 47, if the timer has timed out, then the method proceeds to step 48 shown in FIG. 4B. At this point in the process, a response has not been received from the remote facsimile machine 15 and the timer circuit 21 has timed out. When the first period of time expires, (the timer circuit 21 has timed out), we are within 250 milliseconds of a message time-out occurring in the protocol. If nothing further were done at this point, a message time-out would likely occur and the local facsimile machine 11 may disconnect and hang up. To prevent the message time-out, in step 48 the V.21 modulator 38 is started. In step 49, the HDLC encoder 37 is started. The HDLC encoder 37 sends HDLC flags while it is idle. Then in step 50 a one second timer 21 is started. Step 50 involves delaying for a second predetermined period of time after the HDLC encoder is started. Thus, HDLC flags are sent during the second predetermined period of time. The second predetermined period of time is preferably one second. This is based upon the T.30 specification.

In step 51, a determination is made whether the second predetermined period of time has expired. If not, the method loops back to step 51. When the second predetermined period of time has expired, the method proceeds to step 52. This one second period of time during which HDLC flags are sent is provided for in the T.30 specification. The T.30 protocol requires the V.21 ch 2 preamble to be one second. Normally, the one second of HDLC flags would be followed by the contents of the message or response. However, this one second time limitation is typically not monitored, and a time-out is unlikely to occur if the one second duration is exceeded. Time-outs usually occur when the channel is idle. During the time that the preamble is being sent, i.e., the HDLC flags are being sent, the local facsimile machine 11 would think a message has been received and is about to follow the preamble. Thus, the local facsimile machine will not time-out if the HDLC flags exceed the one second duration provided in the T.30 specification. This feature can be advantageously employed in accordance with the present invention to extend the period of time during which HDLC flags are being sent if a response from the remote facsimile machine 15 has not been received or has been delayed over the IP network 10.

The time during which HDLC flags are generated is extended as shown in steps 52–56 of FIG. 4B. In step 52, a timer circuit 21 is started for a third predetermined period of time, and the method checks in step 53 to determine whether a response has been received from the remote facsimile machine 15. If a response has been received in step 53, the method proceeds to step 54 and a response is sent to the local facsimile machine 11 by the local gateway 12. The method is completed in step 55 in this example.

However, if the response has not been received from the remote facsimile machine 15 in step 53, the method proceeds to step 56 where a determination is made as to whether the third predetermined period of time has expired. If the timer 21 has not timed out in step 56, the method loops back to step 53 to determine whether a response has been received from the remote facsimile machine 15. In a preferred embodiment, the third predetermined period of time is preferably two seconds. The third predetermined period of time is chosen to be a sufficient period of time within which a response is normally expected to be received. It may be arbitrarily chosen, or may be empirically determined. For example, during training of the facsimile, response times may be observed and the third predetermined period of time set to correspond to the observed delay experienced in this particular connection, or some multiple thereof. If a third predetermined period of time of two seconds is chosen, then it will be appreciated that a total delay of a maximum of three seconds is employed during which HDLC flags will be sent while waiting on a delayed response from the remote facsimile machine 15. This three second delay should be sufficient in most cases to prevent a message time-out in the T.30 protocol.

In step 56, if the third predetermined period of time has expired, and no response has been received, then the method preferably proceeds to step 57 and reverts to a spoofing scheme. For example, in step 57 a T.30 command repeat message may be sent. As discussed above, the command need not be passed to the remote facsimile machine 15 by the gateway 12, but the local facsimile machine 11 would restart and reset its time-out timers thinking it had sent a second command in response to the command repeat message. The spoofing scheme is designed so that when a response eventually is received from the remote facsimile machine 15, the local facsimile machine 11 would assume it was an on-time response to the second command (i.e., response to the "command repeat" message), and not a late response to the first command. In this manner, a time-out may be prevented even under conditions of unusual delay exceeding the combined second and third predetermined periods of time (i.e., delayed more than three seconds).

While the invention has been described herein with reference to an example involving preferred predetermined periods of time, the present invention may be advantageously applied to methods utilizing other periods of time. The periods of time chosen may be predetermined, or may be empirically determined based upon the connection characteristics or other factors. While the method has been described as a process for extending the one second HDLC flag generation for an additional two second period of time, the steps shown in FIG. 4B as steps 50–56 could be combined into a single three second period of time during which a check is made for a response from the remote facsimile machine 15, and if a response is received during such period of time, the message is promptly sent to the local facsimile machine 11.

Those skilled in the art will appreciate, after having the benefit of this disclosure, that various modifications may be made to the specific embodiment of the invention described herein for purposes of illustration without departing from the spirit and scope of the invention. The description of a preferred embodiment provided herein is intended to provide an illustration of the principles of the invention, and to teach a person skilled in the art how to practice the invention. The invention, however, is not limited to the specific embodiment described herein, but is intended to encompass all variations within the scope of the appended claims.

I claim:

1. A method for use by a gateway device for sending facsimile transmissions over an internet protocol network, comprising the steps of:

determining whether a response has been received from a remote facsimile machine before a time-out has occurred in accordance with a predetermined protocol;

if said response has not been received, starting an HDLC encoder to send HDLC flags for a predetermined period of time, before said time-out occurs, as preamble HDLC flags for said response;

determining whether said response has been received from the remote facsimile machine before expiration of said predetermined period of time; and if said response is received within said predetermined period of time, sending said response to a local facsimile machine; otherwise, sending a command repeat message to said local facsimile machine.

2. The method according to claim 1, wherein:

the predetermined period of time is three seconds.

3. A facsimile over network method for use by a gateway device, said method comprising:

starting a first time-out period;

waiting for a response from a remote facsimile device for delivering said response to a local facsimile device;

monitoring said first time-out period, wherein said first time-out period is shorter than a second time-out period started by said local facsimile device;

transmitting HDLC flags to said local facsimile device upon expiration of said first time-out period for a predetermined flag transmission period;

sending said response to said local facsimile device if said response is received prior to expiration of said predetermined flag transmission period; and sending a command repeat message to said local facsimile device if said response is not received prior to expiration of said predetermined flag transmission period.

4. The method of claim 3 further comprising: receiving a command from said local facsimile device in response to said command repeat message.

5. The method of claim 4, wherein said command is not sent to said remote facsimile device.

6. The method of claim 5, wherein if said response is not received prior to expiration of said predetermined transmission period, said predetermined transmission period is extended.

7. The method of claim 6, wherein if said response is not received prior to expiration of said extended predetermined transmission period, sending said command repeat message to said local facsimile device.

8. A gateway device capable of supporting facsimile over network, said gateway device comprising:

a timer; and a processor capable of starting said timer for a first time-out period, waiting for a response from a remote facsimile device for delivering said response to a local facsimile device, monitoring said timer, wherein said first time-out period is shorter than a second time-out period started by said local facsimile device, transmitting HDLC flags to said local facsimile device upon expiration of said first time-out period for a predetermined flag transmission period, sending said response to said local facsimile device if said response is received prior to expiration of said predetermined flag transmission period, and sending a command repeat message to said local facsimile device if said response is not received prior to expiration of said predetermined flag transmission period.

9. The device of claim 8, wherein said processor is further capable of receiving a command from said local facsimile device in response to said command repeat message.

10. The device of claim 9, wherein said processor does not send said command to said remote facsimile device.

11. The device of claim 10, wherein if said processor does not receive said response prior to expiration of said predetermined transmission period, said processor extends said predetermined transmission period.

12. The device of claim 11, wherein if said processor does not receive said response prior to expiration of said extended predetermined transmission period, said processor sends said command repeat message to said local facsimile device.

* * * * *